Aug. 5, 1958 W. A. SILJANDER 2,845,818
STEERING APPARATUS FOR MOTOR VEHICLES
Filed June 7, 1957 4 Sheets-Sheet 1
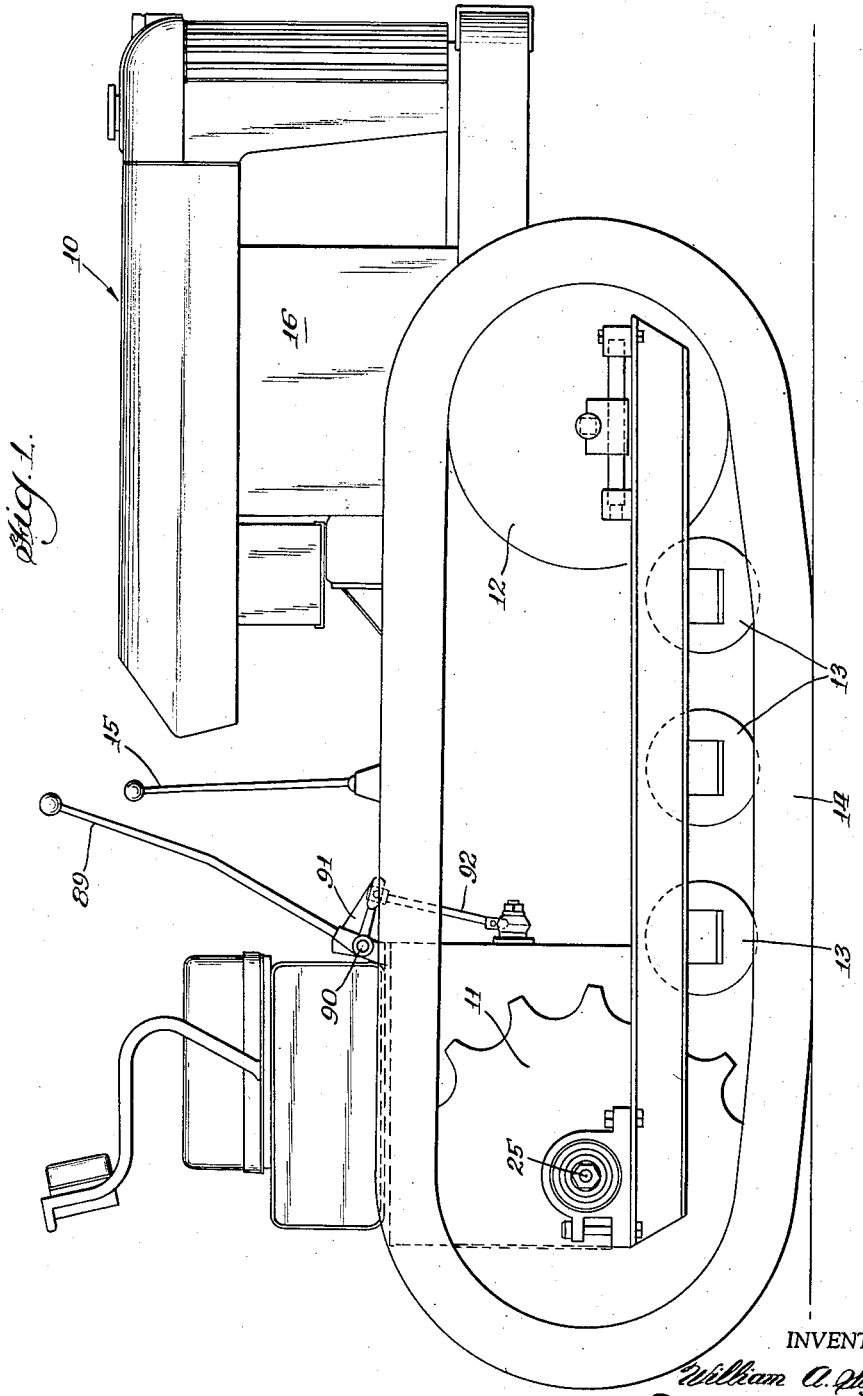
INVENTOR.
William A. Siljander
BY
Atty.

Aug. 5, 1958  W. A. SILJANDER  2,845,818
STEERING APPARATUS FOR MOTOR VEHICLES
Filed June 7, 1957  4 Sheets-Sheet 2

INVENTOR.
William A. Siljander
BY Paul O. Pippel
Atty.

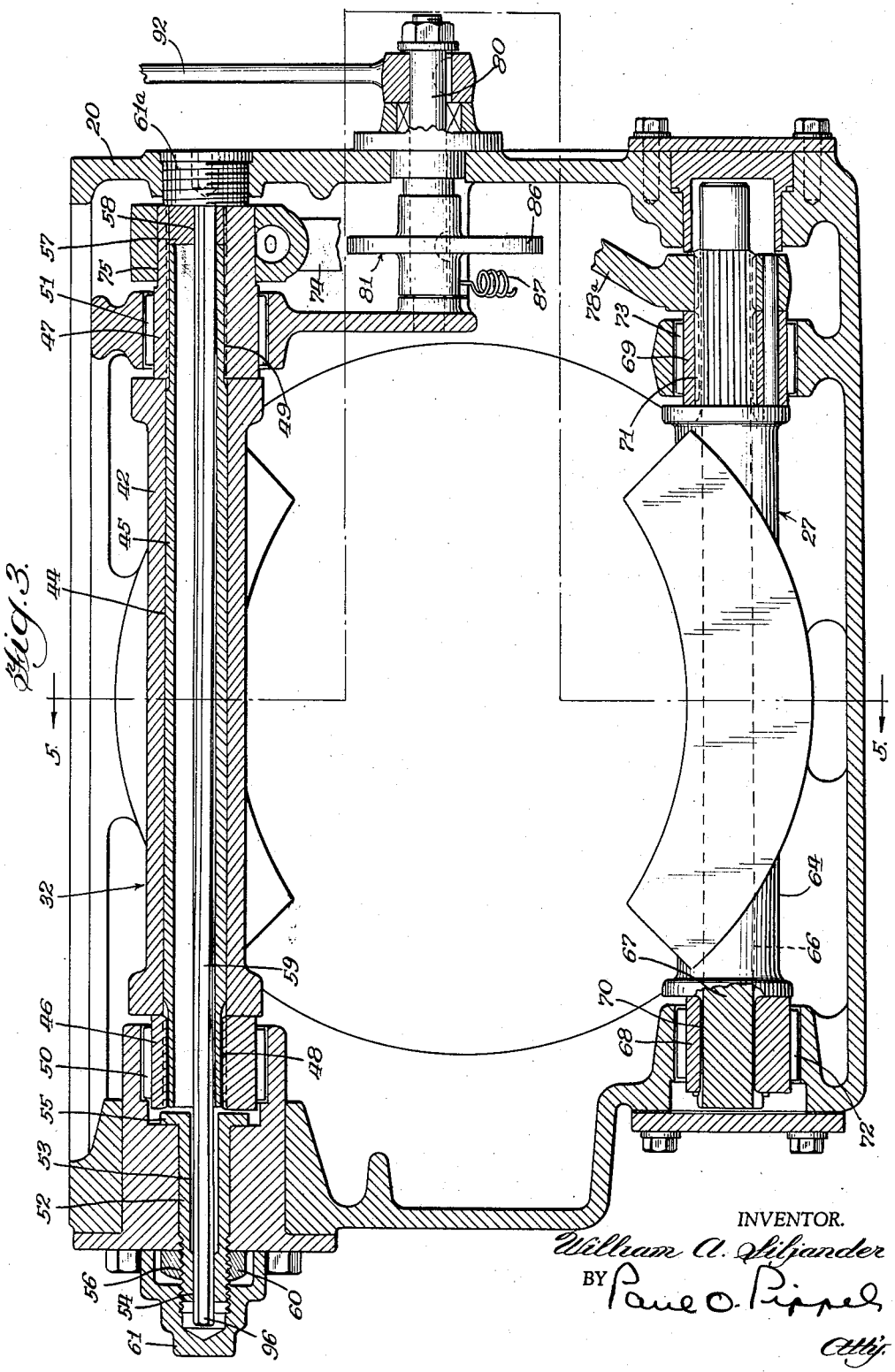

Aug. 5, 1958 W. A. SILJANDER 2,845,818
STEERING APPARATUS FOR MOTOR VEHICLES
Filed June 7, 1957 4 Sheets-Sheet 4
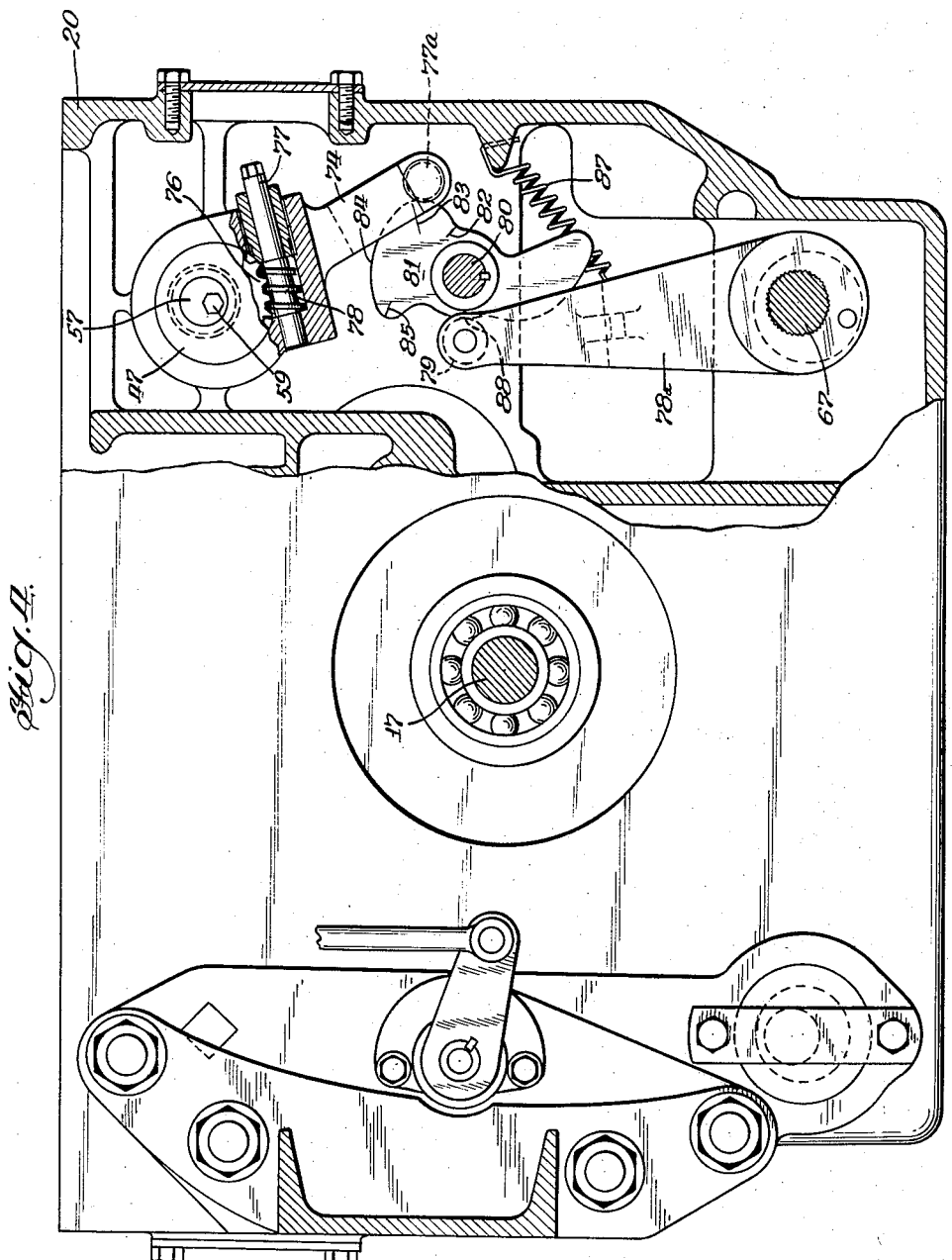
INVENTOR.
William A. Siljander
BY Paul O. Pippel
Atty.

United States Patent Office 2,845,818
Patented Aug. 5, 1958

2,845,818

STEERING APPARATUS FOR MOTOR VEHICLES

William A. Siljander, Oak Park, Ill., assignor to International Harvester Company, Chicago, Ill., a corporation of New Jersey Application June 7, 1957, Serial No. 664,361

8 Claims. (Cl. 74—710.5)

This invention relates to motor vehicles and is primarily concerned with steering apparatus for crawler vehicles.

An object of the invention is to provide a torsion bar for normally keeping a brake on the drive to one side of a motor vehicle in engagement.

Another object of the invention is to provide a single lever for a pair of brakes on the drive to one side of a motor vehicle operative upon actuation by the vehicle operator to release one brake and engage the other brake.

A further object of the invention is to provide means for adjusting the torque in the torsion bar.

A still further object of the invention is to provide for a single lever for a pair of brakes on the drive to one side of a motor vehicle mechanism whereby one effort on the lever is required to release one brake and when this brake is released this effort is eliminated and all new effort on the lever goes to engage the other brake thus making it easier for the vehicle operator to actuate the lever.

The foregoing and other objects of the invention will be apparent from the construction and arrangement illustrated in the accompanying drawings wherein:

Figure 1 is a side elevational view of a crawler tractor.

Figure 2 is a horizontal sectional view of the driving means and steering apparatus for the tractor, Figure 3 is a vertical longitudinal sectional view through a housing on the tractor showing two brakes for controlling one drive sprocket of the tractor.

Figure 4 is a transverse elevational view of the housing on the tractor with a portion of the housing being broken away to show part of the mechanism for releasing and engaging the two brakes for controlling one drive sprocket of the tractor, and Figure 5 is a partly sectional and partly elevational view taken on the line 5—5 of Figure 3.

In the past a disc clutch and band type brake have been provided for each drive sprocket of a crawler vehicle to rotate the respective drive sprocket or to take part in the steering of the vehicle. The teeth for attaching the discs to the clutch parts shear off and the discs are free to float and no longer serve to engage the clutch parts. A coil spring having the same longitudinal center as the clutch discs serves serves to keep the clutch parts in engagement normally. The band type brake required frequent adjustment.

A hand lever is provided for each clutch and movement of the hand lever in one direction compresses the coil spring to disengage the clutch. A foot pedal was provided for each brake to apply the brake.

The invention proposes a steering and driving apparatus for the drive sprockets of a crawler vehicle. The steering and driving apparatus for each drive sprocket is comprised of an internal ring gear driven by the engine of the vehicle and an axle section is disposed on the same centerline as the internal ring gear and a carrier is fixedly secured to the axle section and carries a plurality of spur gears which mesh with the internal ring gear. A large spur gear is rotatably mounted on the axle section and meshes with the gears on the carrier. A first brake includes a disc fixedly secured to the carrier and a shoe rotatably mounted in a housing on the vehicle. A second brake includes a disc fixedly secured to the large spur gear and a shoe rotatably mounted in the housing. By holding or releasing the first and second brakes for each drive sprocket the vehicle may be driven forward or steered in a chosen direction. A torsion bar is mounted in the housing and normally keeps the second brake engaged by urging the shoe against the disc. A lever is mounted on the tractor and is operatively connected to the first and second brakes. When the lever is free the first brake is released and the second brake engaged. When the lever is pulled by the vehicle operator the second brake is released and the first brake is engaged. The planetary gearing with the two brakes is more compact than the coventional disc clutch and band brake and with the planetary gearing there is a speed reduction from the drive shaft to the respective drive sprocket. The second brake in applicant's arrangement has a longer life than the conventional disc clutch discussed above and only infrequent adjustment of the first brake is required. The torsion bar arrangement is very compact and is out of the weather and in the event of failure of the torsion bar the driver of the vehicle would not be injured since the torsion bar is disposed in a housing. The torsion bar is located in a space that cannot be used for anything else on the vehicle thereby resulting in a saving of space.

In the drawings, 10 generally designates a vehicle in the form of a crawler tractor. The crawler tractor 10 has propelling means of drive sprockets 11, large front rollers 12, intermediate rollers 13 and endless tracks 14. The crawler tractor 10 has a conventional transmission and a gear shift 15 therefor. The transmission is connected to the crankshaft of the engine 16 of the tractor. A drive shaft 17 is connected to the transmission and has a bevel gear 18 fixedly secured thereon. A carrier 19 is disposed in a housing 20 mounted on the tractor and is rotatably mounted in roller bearings supported by the housing and has a large bevel gear 21 integral therewith which meshes with the bevel gear 18. Internal ring gears 22 and 23 are integral with each end of the carrier 19 and a pair of axle sections 24 and 25 are arranged in end spaced relation and the adjacent ends of the axle section are rotatably disposed in the carrier. The other ends of the axle sections 24 and 25 are fixedly secured to their respective drive sprockets 11. A carrier 26 is splined on the axle section 24 and a brake 27 has a disc 28 fixedly secured to the carrier. Three shafts 29 are arranged one hundred and twenty degrees apart on a circle and are fixedly secured to the carrier 26. A spur gear 30 is rotatably mounted on each shaft 29 and meshes with the internal ring gear 22. A spur gear 31 is rotatably mounted on the carrier 26 and axle section 24 and meshes with the spur gears 30. A brake 32 has a disc 33 fixedly secured to the spur gear 31. A carrier 34 is splined on the axle section 25 and a brake having a disc 35 is fixedly secured to the carrier. Three shafts 36 are arranged one hundred and twenty degrees apart and are fixedly secured to the carrier 34 and a spur gear 37 is rotatably mounted on each shaft and meshes with the internal ring gear 23. A spur gear 38 is rotatably mounted on the carrier 34 and axle section 25 and meshes with the spur gears 37. A brake has a disc 39 fixedly secured to the spur gear 38.

The brake 32 is comprised of a backing plate 40 secured to the housing 20 of the tractor and a lining 41 is secured to the backing plate. The brake 32 is further comprised of a shoe 42 having a lining 43 secured thereto. The shoe 42 is provided with a hole 44 extending longitudinally therethrough and a tube 45 is disposed in the hole in the shoe. A pair of elements 46 and 47 are provided with eccentric holes 48 and 49 respectively which receive the ends of the tube 45 with the tube and holes being provided with splines and the elements are disposed against the ends of the shoe 42 and are rotatably mounted in the housing 20 by means of bearings 50 and 51. A sleeve 52 is provided with an opening 53 extending therethrough and a portion 54 of the length of the opening is polygonal in shape and has a flange 55 on one end thereof and external threads 56 contiguous with the other end thereof. A plug 57 is provided with an eccentric hole 58 and is splined in the element 47 and is disposed against the adjacent end of the tube 45. A polygonal shaped torsion bar 59 is disposed in the tube 45 and in the opening 53 and hole 58 in the sleeve 52 and plug 57 respectively. A nut 60 is disposed on the threads 56 of the sleeve 52 and is disposed against the housing 20 and a cap 61 is screwed on the threads of the sleeve and bears against the housing. A plug 61a is threaded into an opening in the housing 20 and serves to locate the torsion bar arrangement in the housing. The brake 27 has a backing plate 62 secured to the housing 20 and a lining 63 is secured to the backing plate and a shoe 64 is provided and a lining 65 is secured to the shoe. The shoe 64 of brake 27 is provided with an opening 66 extending therethrough and a member 67 is disposed in the opening in the shoe. A pair of elements 68 and 69 are provided with eccentric holes 70 and 71 respectively and these holes have splines fitting over splines on the ends of the member and the elements are disposed against the ends of the shoe 64 of the brake 27 and are rotatably mounted in the housing 20 by means of bearings 72 and 73.

An arm 74 has an opening 75 which receives element 47 and the element is provided with gear teeth 76 and a pin 77 is rotatably mounted in the arm and has a worm 78 which meshes with the gear teeth 76 so that the position of the arm on the element may be adjusted. The outer end of the arm 74 is bifurcated and has a roller 77a mounted between the bifurcations. An arm 78a has one end splined on the member 67 and its outer end is bifurcated and has a roller 79 mounted between the bifurcations. A shaft 80 is rotatably mounted in the housing 20 between the arms 74 and 78 and a cam 81 extends from line 82 to line 83 and a segment 84 in the shape of an arc of a circle extends from line 83 to line 85 and a cam 86 is also provided. The cam 81, segment 84 and cam 86 are all integral and are keyed to the shaft 80. A coil spring 87 is hooked into housing 20 and arm 78a and keeps roller 79 engaged against material 88 connecting segment 84 and cam 86. A lever 89 is pivotally mounted on a shaft 90 mounted on the tractor and a link 91 is fixed to the lever and a link 92 is pivotally connected to link 91 and a link 93 is pivotally connected to link 92 and is fixed to shaft 80. One lever 89 is provided for operating brake 27 having disc 28 and brake 32 having disc 33 and another lever 89 is provided for operating the brake having disc 35 and the brake having disc 39. The gearing and brakes on opposite sides of the centerline of drive shaft 17 are identical.

When the tractor operator is not touching one lever 89 the torsion bar 59 will urge the disc 33 against backing plate 40 and the shoe 42 against the disc so that the brake 32 for that lever is engaged and the brake 27 for that lever is released. When the tractor operator pulls back on the lever 89 shaft 80 is rotated in a clockwise direction as viewed in Figure 4. The rollers 77a on arm 74 rides on cam 81 to move arm 74 in a counterclockwise direction as viewed in Figure 4. There is already an initial torque on torsion bar 59 before lever 89 was moved. The pulling back of lever 89 causes the torsion bar 59 to be twisted still more. Movement of arm 74 in a counterclockwise direction as viewed in Figure 4 causes tube 45 to rotate about point 94 as a center to increase the twist on the torsion bar. One effort is required on lever 89 to release brake 32 through travel of roller 77a on cam 81 and when the roller reaches segment 84 this brake is released and this effort on the lever is eliminated. Continued pulling back of the lever 89 will cause segment 84 to travel on roller 77a and cam 86 will engage roller 79 to move arm 78a counterclockwise as viewed in Figure 4 causing member 67 to rotate about point 95 as a center resulting in the shoe 64 rotating into engagement with disc 28 and urging the disc against backing plate 62 to engage the brake 27. After brake 32 is released all of the new effort on lever 89 goes to engage the brake 27. Thus it requires little exertion by the tractor operator to release brake 32 and engage brake 27. When the tractor operator releases the lever 89 a spring attached to the lever urges it toward the front of the tractor rotating shaft 80 and cams 81 and 86 and segment 84 in a counterclockwise direction and torsion bar 59 urges arm 74 in a clockwise direction and spring 87 urges arm 78a in a clockwise direction all as viewed in Figure 4, to engage brake 32 and release brake 27. The lever 89 for the brake having disc 35 and the brake having disc 39 operates these brakes in the same manner as the brakes 32 and 27 are operated by their respective lever 89.

To adjust the torque in the torsion bar 59 after it has been installed in the housing 20 of the tractor the cap 61 is removed and a wrench is applied to the torsion bar at 96 and a wrench is applied to the nut 60 to loosen it. The end 96 of the torsion bar 59 is then rotated by means of the wrench until shoe 42 engages disc 33 to hold the remote portion of the torsion bar stationary. Further rotation of the end 96 of torsion bar 59 will begin to put twist into it. The end 96 of the torsion bar 59 is then rotated until the desired amount of torque is put into it. The nut 60 is then tightened against the housing 20. The cap 61 is then screwed on sleeve 52.

To turn the tractor to the right the brake having disc 39 is released and the brake having disc 35 is engaged and the brake 32 is engaged and the brake 27 is released. To turn the tractor to the left the brake 32 is released and brake 27 is engaged and the brake having disc 35 is released and the brake having disc 39 is engaged. To move the tractor in a forward direction the brake 32 and the brake having disc 39 are engaged and the brake 27 and the brake having disc 35 are released.

The torsion bar arrangement is very compact and is out of the weather and in the event of failure of the torsion bar the driver of the vehicle would not be injured since the torsion bar is disposed in a housing. The torsion bar is located in a space on the tractor that cannot be used for anything else thereby resulting in a saving of space. A single lever serves to release one brake and engage the other brake for one drive sprocket of the tractor. Further, one effort is required on the lever by the vehicle operator to release one brake and upon release of the brake this effort is eliminated, and all new effort on the lever goes to engage the other brake. Further means are provided for adjusting the torque in the torsion bar.

What is claimed is:
1. In a vehicle having an engine and a pair of axle sections arranged in end to end spaced relation and a carrier disposed between the axle sections and propelling means on the other ends of the axle sections and steering apparatus between the carrier and each axle section, each steering apparatus comprising a gear fixedly secured to the carrier, a second carrier fixedly secured to the respec- tive axle section, a plurality of gears rotatably mounted on the second carrier, a first brake including a disc fixedly secured to the second carrier and means for engaging the disc mounted on the vehicle, a gear rotatably mounted on the respective axle section and meshing with the gears on the second carrier, a second brake including a disc fixedly secured to the gear mounted on the axle section and a disc mounted on the vehicle, a housing mounted on the vehicle, a torsion bar having one end fixedly secured to the housing, a first arm secured to the torsion bar, a second arm connected to the engaging means on the first brake, a lever pivotally mounted on the vehicle, and means connected to the lever and engaging the first and second arms, the torsion bar normally urging the shoe against the disc of the second brake and the first brake being released and movement of the lever causing the second brake to be released and the first brake to be engaged.

2. In a vehicle having an engine and a pair of axle sections arranged in end to end spaced relation and a carrier disposed between the axle sections and propelling means on the other ends of the axle sections and steering apparatus between the carrier and each axle section, each steering apparatus comprising a gear fixedly secured to the carrier, a second carrier fixedly secured to the respective axle section, a plurality of gears rotatably mounted on the second carrier, a first brake including a disc fixedly secured to the second carrier and means for engaging the disc mounted on the vehicle, a gear rotatably mounted on the respective axle section and meshing with the gears on the second carrier, a second brake including a disc fixedly secured to the gear mounted on the axle section and a shoe disposed on one side of the disc and a backing plate disposed on the other side of the disc and fixedly secured to the vehicle, a housing mounted on the vehicle, the shoe on the second brake being disposed in the housing and provided with a hole extending longitudinally therethrough, a tube disposed in the hole in the shoe of the second brake, a first element and a second element each provided with an eccentric hole therethrough fixedly secured on the ends of the tube against the ends of the shoe of the second brake and rotatably mounted in the housing, a plug provided with an eccentric hole disposed in the second element against the adjacent end of the tube and secured to the element, a polygonal shaped torsion bar disposed in the tube and having one end fixedly secured to the housing and having its other end disposed in the hole in the plug, a first arm fixedly secured to the second element, a second arm connected to the engaging means on the first brake, a lever pivotally mounted on the vehicle, and means connected to the lever and engaging the first and second arms, the torsion bar normally urging the disc against the backing plate and the shoe against the disc of the second brake and the first brake being released and movement of the lever causing the second brake to be released and the first brake to be engaged.

3. In a vehicle having an engine and a pair of axle sections arranged in end to end spaced relation and a carrier disposed between the axle sections and propelling means on the other ends of the axle sections and steering apparatus between the carrier and each axle section, each steering apparatus comprising a gear fixedly secured to the carrier, a second carrier fixedly secured to the respective axle section, a plurality of gears rotatably mounted on the second carrier, a first brake including a disc fixedly secured to the second carrier and a shoe disposed on one side of the disc and a backing plate disposed on the other side of the disc and fixedly secured to the vehicle, a gear rotatably mounted on the respective axle section and meshing with the gears on the second carrier, a second brake including a disc fixedly secured to the gear mounted on the axle section and a shoe disposed on one side of the disc and a backing plate disposed on the other side of the disc and fixedly secured to the vehicle, a housing mounted on the vehicle, the shoe on the second brake being disposed in the housing and provided with a hole extending longitudinally therethrough, a tube disposed in the hole in the shoe of the second brake, a first element and a second element each provided with an eccentric hole therethrough fixedly secured on the ends of the tube against the ends of the shoe of the second brake and rotatably mounted in the housing, a plug provided with an eccentric hole disposed in the second element against the adjacent end of the tube and secured to the element, a polygonal shaped torsion bar disposed in the tube and having one end fixedly secured to the housing and having its other end disposed in the hole in the plug, the shoe of the first brake being provided with an opening extending therethrough, a member disposed in the opening in the shoe of the first brake, a third element and a fourth element each provided with an eccentric hole fixedly secured on the ends of the member and disposed against the ends of the shoe of the first brake and rotatably mounted in the housing, a first arm fixedly secured to the second element and having a roller thereon, a second arm fixedly secured to the member and having a roller thereon, a shaft rotatably mounted in the housing between the first and second arms, a first cam fixedly secured to the shaft, a second cam fixedly secured to the shaft, and a lever pivotally mounted on the vehicle and operatively connected to the shaft, the torsion bar normally urging the disc against the backing plate and the shoe against the disc of the second brake and the first brake being released and movement of the lever causing the first cam to release the second brake and the second cam urging the disc against the backing plate and the shoe against the disc of the first brake.

4. In a vehicle having an engine and a pair of axle sections arranged in end to end spaced relation and a carrier disposed between the axle sections and propelling means on the outer ends of the axle sections and steering apparatus between the carrier and each axle section, each steering apparatus comprising an internal ring gear fixedly secured to the carrier, a second carrier fixedly secured to the respective axle section, a plurality of gears rotatably mounted on the carrier, a first brake including a disc fixedly secured to the second carrier and a shoe disposed on one side of the disc and a backing plate disposed on the other side of the disc and fixedly secured to the vehicle, a sun gear rotatably mounted on the respective axle section and meshing with the gears on the second carrier, a second brake including a disc fixedly secured to the sun gear and a shoe disposed on one side of the disc and a backing plate disposed on the other side of the disc and fixedly secured to the vehicle, a housing mounted on the vehicle, the shoe on the second brake being disposed in the housing and provided with a hole extending longitudinally therethrough, a tube disposed in the hole in the shoe of the second brake, a first element and a second element each provided with an eccentric hole therethrough fixedly secured on the ends of the tube against the ends of the shoe and rotatably mounted in the housing, a sleeve provided with an opening extending therethrough and a portion of the length of the opening being polygonal in shape and having a flange on one end thereof and external threads contiguous with the other end thereof, a plug provided with an eccentric hole disposed in the second element against the adjacent end of the tube and secured to the element, a polygonal shaped torsion bar disposed in the tube and in the opening and hole in the sleeve and plug respectively, a nut threaded on the sleeve and disposed against the housing, the shoe of the first brake being provided with an opening extending therethrough, a member disposed in the opening in the shoe of the first brake, a third element and a fourth element each provided with an eccentric hole fixedly secured on the ends of the member and disposed against the ends of the shoe of the first brake and rotatably mounted in the housing, a first arm having one end fixedly secured to the second element and having a roller on its other end, a second arm having one end fixedly secured to the member and having a roller on its other end, a shaft rotatably mounted in the housing between the first and second arms, a first cam fixedly secured to the shaft, a second cam fixedly secured to the shaft, and a lever pivotally mounted on the vehicle and operatively connected to the shaft, the torsion bar normally urging the disc against the backing plate and the shoe against the disc of the second brake and the first brake being released and movement of the lever causing the first cam to release the second brake and the second cam urging the disc against the backing plate and the shoe against the disc of the first brake.

5. In a vehicle having an engine and a pair of axle sections arranged in end to end spaced relation and propelling means on the outer ends of the axle sections and steering apparatus for each axle section, each steering apparatus comprising a brake including a disc fixedly secured to the respective axle section and a shoe disposed adjacent the disc, a housing mounted on the vehicle, the shoe of the brake being provided with an opening extending therethrough, a member disposed in the opening in the shoe of the brake, a pair of elements each provided with an eccentric hole fixedly secured on the ends of the member and disposed against the ends of the shoe of the brake and rotatably mounted in the housing, turning of the member in one direction urging the shoe against the disc of the brake to prevent rotation of the axle section.

6. In a vehicle having an engine and a pair of axle sections arranged in end to end spaced relation and propelling means on the outer ends of the axle sections and steering apparatus for each axle section, each steering apparatus comprising a brake including a disc mounted on the respective axle section and a shoe disposed adjacent the disc, a housing mounted on the vehicle, the shoe on the brake being disposed in the housing and provided with a hole extending longitudinally therethrough, a tube disposed in the hole in the shoe of the brake, a first element and a second element each provided with an eccentric hole therethrough fixedly secured on the ends of the tube against the ends of the shoe and rotatably mounted in the housing, a sleeve provided with an opening extending therethrough and a portion of the length of the opening being polygonal in shape and having a flange on one end thereof and external threads contiguous with the other end thereof and the flange being disposed in the housing against an inner face thereof and the threaded end projecting from the housing, a plug provided with an eccentric hole disposed in the second element against the adjacent end of the tube and secured to the element, a polygonal shaped torsion bar disposed in the tube and in the opening and hole in the sleeve and plug respectively, a nut threaded on the sleeve and disposed against the housing, an arm fixedly secured to the second element, a lever pivotally mounted on the vehicle, and means connected to the lever and engaging the arm, the torsion bar urging the shoe against the disc of the brake and the torsion bar being adjusted by applying a tool on the end thereof adjacent the nut and applying another tool to the nut and moving the nut on the torsion bar and turning said end of the torsion bar and tightening the nut on the torsion bar against the housing.

7. In a vehicle having an engine and a pair of axle sections arranged in end to end spaced relation and a carrier disposed between the axle sections and propelling means on the other ends of the axle sections and steering apparatus between the carrier and each axle section, each steering apparatus comprising a gear fixedly secured to the carrier, a second carrier fixedly secured to the respective axle section, a plurality of gears rotatably mounted on the second carrier, a first brake including a disc fixedly secured to the second carrier and a shoe disposed adjacent the disc, a gear rotatably mounted on the respective axle section and meshing with the gears on the second carrier, a second brake including a disc fixedly secured to the gear mounted on the axle section and a shoe disposed adjacent the disc, a housing mounted on the vehicle, a torsion bar having one end fixedly secured to the housing, a first arm fixedly secured to the other end of the torsion bar, a second arm connected to the shoe of the first brake, a shaft rotatably mounted in the housing adjacent the first and second arms, a first cam fixedly secured to the shaft, a segment in the shape of an arc of a circle contiguous with the first cam and fixedly secured to the shaft, a second cam fixedly secured to the shaft, and a lever pivotally mounted on the vehicle and operatively connected to the shaft, the torsion bar normally urging the shoe against the disc of the second brake and the first brake being released and movement of the lever causing the first cam to ride against the first arm until the first cam rides off the first arm through the exertion of one effort on the lever to release the second brake and further movement of the lever causing the segment to ride on the first arm to eliminate said one effort and the second cam riding on the second arm to urge the shoe against the disc of the first brake through the exertion of a new effort on the lever.

8. In a vehicle having an engine and a pair of axle sections arranged in end to end spaced relation and propelling means on the outer ends of the axle sections and steering apparatus for each axle section, each steering apparatus comprising a brake including a disc mounted on the respective axle section and a shoe disposed adjacent the disc, a housing mounted on the vehicle, the shoe on the brake being disposed in the housing and provided with a hole extending longitudinally therethrough, a tube disposed in the hole in the shoe of the brake, a first element and a second element each provided with an eccentric hole therethrough fixedly secured on the ends of the tube against the ends of the shoe of the brake and rotatably mounted in the housing, a plug provided with an eccentric hole disposed in the second element against the adjacent end of the tube and secured to the element, a polygonal shaped torsion bar disposed in the tube and having one end fixedly secured to the housing and having its other end disposed in the hole in the plug, the torsion bar normally urging the shoe against the disc of the brake to rotate the axle section and move the respective propelling means.

References Cited in the file of this patent

UNITED STATES PATENTS

| | | |
|---|---|---|
| 2,580,381 | Banker | Jan. 1, 1952 |
| 2,605,653 | Banker | Aug. 5, 1952 |